(12) United States Patent
Chandra et al.

(10) Patent No.: US 8,949,795 B2
(45) Date of Patent: Feb. 3, 2015

(54) GENERATING TEST CASES FOR COVERING ENTERPRISE RULES AND PREDICATES

(75) Inventors: Satish Chandra, Bangalore (IN); Suresh Thummalapenta, Bangalore (IN); Nishant Sinha, Bangalore (IN); Saurabh Sinha, Bangalore (IN); Anand Vaishampayan, Bangalore (IN); Vasanta K. Lakshmi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 13/592,754

(22) Filed: Aug. 23, 2012

(65) Prior Publication Data

US 2014/0059522 A1   Feb. 27, 2014

(51) Int. Cl.
G06F 9/44   (2006.01)

(52) U.S. Cl.
USPC .......................................... 717/126; 717/124

(58) Field of Classification Search
USPC ........................................................ 717/126
See application file for complete search history.

(56) References Cited

U.S. PATENT DOCUMENTS

| | | | |
|---|---|---|---|
| 5,414,836 A * | 5/1995 | Baer et al. ..................... | 714/38.1 |
| 6,470,383 B1 * | 10/2002 | Leshem et al. ................ | 709/223 |
| 6,549,944 B1 * | 4/2003 | Weinberg et al. ............. | 709/224 |
| 7,272,822 B1 * | 9/2007 | Riggins et al. ................ | 717/124 |
| 7,454,399 B2 * | 11/2008 | Matichuk ........................ | 706/53 |
| 7,908,590 B1 | 3/2011 | Min et al. | |
| 8,359,576 B2 * | 1/2013 | Prasad et al. .................. | 717/124 |
| 8,392,890 B2 * | 3/2013 | Miller ........................... | 717/127 |
| 8,479,171 B2 * | 7/2013 | Ghosh ........................... | 717/131 |
| 8,495,585 B2 * | 7/2013 | Miller ........................... | 717/127 |
| 8,627,288 B2 * | 1/2014 | Kimball et al. ............... | 717/124 |
| 8,683,447 B2 * | 3/2014 | Miller ........................... | 717/127 |
| 8,793,656 B2 * | 7/2014 | Huang et al. .................. | 717/124 |
| 2005/0027495 A1 * | 2/2005 | Matichuk .......................... | 703/2 |
| 2006/0010426 A1 | 1/2006 | Lewis et al. | |
| 2006/0117055 A1 * | 6/2006 | Doyle ........................... | 707/102 |
| 2006/0265691 A1 | 11/2006 | Klinger et al. | |
| 2009/0018811 A1 | 1/2009 | Paradkar et al. | |
| 2009/0089618 A1 | 4/2009 | Rajan et al. | |
| 2009/0100345 A1 * | 4/2009 | Miller .......................... | 715/738 |
| 2009/0235262 A1 * | 9/2009 | Ceze et al. .................... | 718/102 |

(Continued)

OTHER PUBLICATIONS

Jesse James Garrett, "Ajax: A new approach to web applications", Feb. 18, 2005, total pp. 5, retrieved from <https://courses.cs.washington.edu/courses/cse490h/07sp/readings/ajax_adaptive_path.pdf>.*

(Continued)

*Primary Examiner* — Don Wong
*Assistant Examiner* — Marina Lee
(74) *Attorney, Agent, or Firm* — Ryan, Mason & Lewis, LLP (57) ABSTRACT

Techniques, an apparatus and an article of manufacture for generating test cases for covering enterprise rules and predicates. A method includes obtaining a web application and a specification of at least one enterprise rule, constructing a link graph that captures at least one navigation path in the web application, and performing a traversal of the web application guided by the link graph to generate an executable test case that drives the web application along one of the at least one navigation paths in which the at least one enterprise rule is covered to determine the web application's conformance to the at least one enterprise rule, wherein the executable test case is a sequence of one or more test steps, each test step representing an action to be performed on the web application and/or a verification of the application state.

23 Claims, 5 Drawing Sheets

(56) References Cited

U.S. PATENT DOCUMENTS

| | | | |
|---|---|---|---|
| 2010/0064281 A1* | 3/2010 | Kimball et al. | 717/124 |
| 2010/0125832 A1* | 5/2010 | Prasad et al. | 717/124 |
| 2010/0293557 A1* | 11/2010 | Tkachuk et al. | 719/318 |
| 2010/0312592 A1 | 12/2010 | Sallakonda et al. | |
| 2011/0289488 A1* | 11/2011 | Ghosh | 717/131 |
| 2014/0059522 A1* | 2/2014 | Chandra et al. | 717/126 |
| 2014/0165043 A1* | 6/2014 | Pasala et al. | 717/124 |

OTHER PUBLICATIONS

Bakota et al. Semi-automatic test case generation from business process models. In Proceedings of the 11th Symposium on Programming Languages and Software Tools and 7th Nordic Workshop on Model Driven Software Engineering, pp. 5-18. Tampere, Finland, Aug. 26-28, 2009.

Anand et al. Business rule-based test automation a novel approach for accelerated testing. SETLabs Briefings, Special Issue, Apr. 2007, pp. 21-28.

Willmor et al. Testing the implementation of business rules using intentional database tests. Testing: Academic and Industrial Conference—Practice and Research Techniques, 2006. TAIC PART 2006. Proceedings Date of Conference: Aug. 29-31, 2006.

Blanco et al. A first approach to test case generation for BPEL compositions of web services using scatter search. Software Testing, Verification and Validation Workshops, 2009. ICSTW '09. International Conference on Date of Conference: Apr. 1-4, 2009.

* cited by examiner

```
                                                            ┌─202
    Input: Rule r, LG static or dynamic link graph
    Output: SUCCESS or FAIL 1  pref:= FINDBESTPREFIX (r);
 2  lp := Last page in the sequence pref;
 3  T := GETTARGETS (r);
 4  Π :=FINDPATHS (lp, T, LG);
 5  ActTree = ∅; i :=0;
 6  Execute prefix pref;
 7  Get current page cPage of the application;
 8  while cPage is not a leaf in Π do
 9  │   succs := GETSUCCESSORS (cPage) ;
10  │   Act := GETCLICKABLES (cPage) ;
11  │   succSet := ∅;
12  │   foreach action act in Act do
13  │   │   succ := FOLLOW (act);
14  │   │   if succ ≺ succ ∧ succ ∈ succs then
15  │   │   │   succSet +=succ;
16  │   │   │   ActTree := ActTree ∪ {(cPage, act, succ)}
    │   │
17  │   succ := PICKMINWEIGHTPAGE (succSet);
18  │   cPage := succ;

19  Let π_c be the concrete path computed;
20  UPDATERULEPHASE(r, π_c);
21  if Phase of r is updated to C then
    │   return SUCCESS
22  if Phase of r is updated to T then
23      pref=π_c;
24      goto step 2;

/* Backtrack to find the next concrete path */;
25  t := Pick an action sequence from ActTree with unexplored actions ;
26  if no t exists then
    │   return FAIL
27  Execute prefix pref; Execute t ;
28  goto step 7;
```

FIG. 3

| STEP | ACTION | TYPE | TARGET NAME | DATA |
|---|---|---|---|---|
| 1 | SELECT | LINK | ADMINISTRATION | |
| 2 | ENTER | TEXT BOX | USER ID | ADMIN |
| 3 | ENTER | TEXT BOX | PASSWORD | ADMIN |
| 4 | CLICK | BUTTON | SUBMIT | |
| 5 | SELECT | LINK | CARD TYPES | |
| 6 | SELECT | LINK | INSERT | |
| 7 | ENTER | TEXT BOX | NAME | DISCOVER |
| 8 | SELECT | BUTTON | INSERT | |
| 9 | SELECT | LINK | REGISTRATION | |
| 10 | EXISTS | COMBO BOX | CREDIT CARD TYPE | DISCOVER |

GENERATING TEST CASES FOR COVERING ENTERPRISE RULES AND PREDICATES

FIELD OF THE INVENTION

Embodiments of the invention generally relate to information technology, and, more particularly, to web applications.

BACKGROUND

Enterprise applications can have complex logic that governs application behavior, and the complexity may manifest itself in different ways. For instance, the complexity may show up as complicated and numerous navigation paths in the application user interface, as significant interactions between data entered on different application screens, or as complex rules related to access control, business calculations, etc.

Functional specification of enterprise applications is often given in the form of enterprise rules, which can describe enterprise logic, access control, or navigational properties of an application's graphical user interface (GUI). Therefore, enterprise rules can be a natural starting point for the design of functional tests.

The goal of functional testing of applications is to exercise meaningful or interesting application behavior. Although testing can be guided to cover navigation paths, exhaustive coverage is impractical in most cases, as applications can have prohibitively large numbers of paths. Moreover, such testing can be wasteful because not all paths exercise interesting application behavior. Instead, it can be more fruitful for functional testing of enterprise applications to be directed toward covering use cases, enterprise rules, or selected combinations of values for different application parameters.

For example, in an online shopping application, different parameters, such as invoice amount and payment method, can interact to determine some enterprise calculation such as the offer of a discount or a gift coupon. Thus, testing can be directed to covering different combinations of values for these parameters (or predicates).

Creating a test that covers a rule presents challenges, however. Such a task requires identification of a potentially complex sequence of actions (on the application user interface) along with suitable data values. In existing approaches, this is performed manually, and therefore, is both expensive in human time and subject to errors of omission that can lead to inadequate testing. Hence, there is a need for an automated methodology for test generation from enterprise rules and predicates.

SUMMARY

In one aspect of the present invention, techniques for generating test cases for covering enterprise rules and predicates are provided. An exemplary computer-implemented method for automated test case generation for a web application can include steps of obtaining a web application and a specification of at least one enterprise rule, constructing a link graph that captures at least one navigation path in the web application, and performing a traversal of the web application guided by the link graph to generate an executable test case that drives the web application along one of the at least one navigation paths in which the at least one enterprise rule is covered to determine the web application's conformance to the at least one enterprise rule, wherein the executable test case is a sequence of one or more test steps, each test step representing an action to be performed on the web application and/or a verification of the application state.

In another aspect of the invention, an exemplary computer-implemented method for automated test case generation for a web application can include steps of obtaining a web application, a specification of at least one enterprise rule, and at least one existing test case, wherein a test case is a sequence of one or more test steps, each test step representing an action to be performed on the web application, determining coverage of the at least one enterprise rule attained by the at least one existing test case, constructing a link graph that captures at least one navigation path in the web application, and performing a traversal of the web application guided by the link graph to generate a modified version of the at least one existing test case that drives the web application along one of the at least one navigation paths in which the at least one enterprise rule applies to determine the web application's conformance to the at least one enterprise rule.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes generating test cases for covering enterprise rules and predicates. At least one embodiment of the invention includes automatically generating tests that drive an application along paths in which enterprise rules apply (also referred to herein as "covered"), so that the application's conformance to relevant enterprise rules can be tested. The techniques detailed herein do not analyze the application's server-side implementation, but rather perform a guided search through a network of interconnected pages that are created dynamically by the server-side scripts and delivered to the browser.

Formally, a rule has an antecedent and a consequent, both of which are predicates over an observable state of an application (for example, observable at the user interface level). As further described herein, a test should drive the application to a state in which the antecedent is true, and then drive the application along an execution path such that the consequent can be observed.

As noted, at least one embodiment of the invention is black box in nature, as it does not analyze the implementation of the application under test, but rather relies on driving the application via its GUI and observing the GUI state after each test step. A set of rules or predicates can be used as input, and an output can include test scripts, one or more per rule, or for as many rules as an analysis is able to cover.

As described in further detail herein, at least one embodiment of the invention includes aspects of rule-coverage analysis and test-case synthesis. Rule coverage analysis operates on execution traces of test cases, wherein an execution trace captures the sequence of web pages visited by the steps of a test case and the GUI state after each step. An aspect of the invention includes analyzing execution traces to determine which of the input rules or predicates are covered by the traces, and computing a coverage matrix.

Note also that although a test may not cover a particular rule, the test may exercise the rule partially. This makes the test a suitable candidate for seeding the synthesis of a new test case that actually covers that rule. Thus, instead of synthesizing a new test case from scratch, at least one embodiment of the invention can include first attempting to modify or extend an existing test case to create a new covering test case.

Test-case synthesis identifies target user-interface screens to which it needs to navigate in order to cover a given rule or predicate. At least one embodiment of the invention includes carrying out a guided exploration including performing a shallow analysis of server-side scripts to approximate the set of possible navigation paths to target screens. Additionally, an aspect of the invention includes dynamically exploring the application to determine a concrete navigation path along which the target screens can be reached along with suitable data values required to cover a rule or predicate.

Aspects of the invention are described in additional detail below.

The interpretation of an enterprise rule $r=(\alpha, \delta, \Gamma)$ is that if $\alpha$ (antecedent) holds at some point in a program execution, then $\delta$ (consequent) must hold some time in the future during the same execution. Further, the invariant $\Gamma$ must hold at each step of the execution between the step where $\alpha$ becomes true and the step where $\delta$ holds. Conversely, if there exists an execution in which $\alpha$ and $\Gamma$ hold but $\delta$ is violated in the future, that execution has revealed a fault in the implementation of r in the application. Revealing such faults is a goal of rule-directed test-case generation. Additionally, enterprise rule specifications enable the construction of test cases, for example, with an automated oracle (that is, an assertion on the consequent condition).

A rule can be stated in a restricted vocabulary of rule variables drawn from labels on the application user interface. A test observes a rule variable if the test visits the page on which the label matching the variable occurs. Further, a test triggers a rule if the test observes all antecedent variables of the rule and the antecedent evaluates true at some step of the test. A test covers a rule if the test triggers the rule antecedent and observes all consequent variables of the rule. Also, a coverage matrix records the status of each rule with respect to each test input. The concept of rule phase tracks the progress made with respect to covering a rule. A rule is in phase AO if all antecedent variables of the rule have been observed, in phase T if the rule has been triggered, and in phase C if the rule has been covered.

Figure 1:
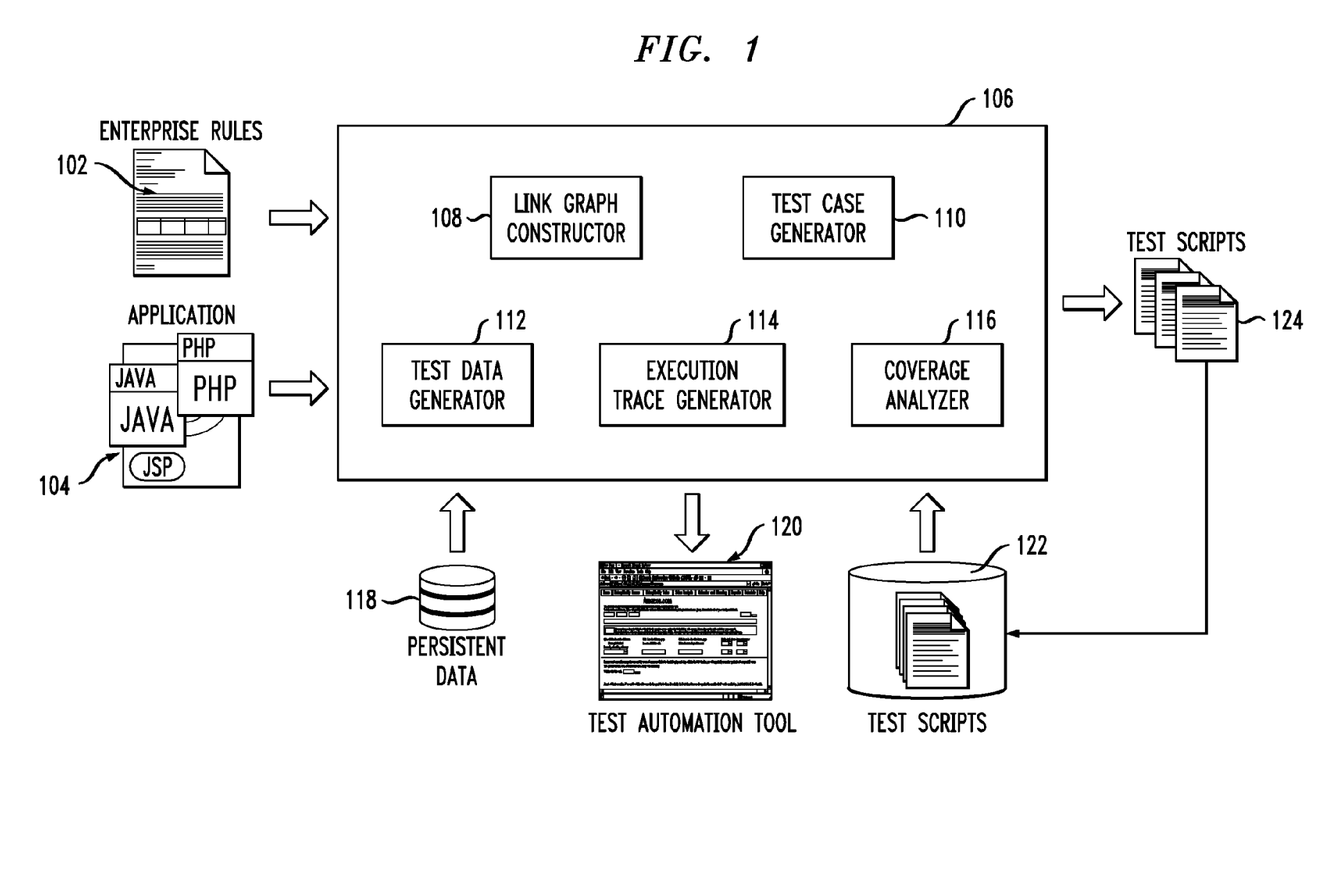
FIG. 1 is a diagram illustrating system components, according to an embodiment of the invention.

FIG. 1 is a diagram illustrating system components, according to an embodiment of the invention. By way of illustration, FIG. 1 depicts enterprise rules 102 and an application 104 being provided to system 106, which includes a link graph constructor component 108, a test case generator component 110, a test data generator component 112, an execution trace generator component 114 and a coverage analyzer component 116. Also provided to system 106 is form data 118 required to be input on web page forms. As also depicted in FIG. 1, system 106 outputs test scripts 124, which can be provided to a test scripts database 122 (which also interacts with system 106). Further, system 106 provides output to a test automation tool component 120.

Figure 2:
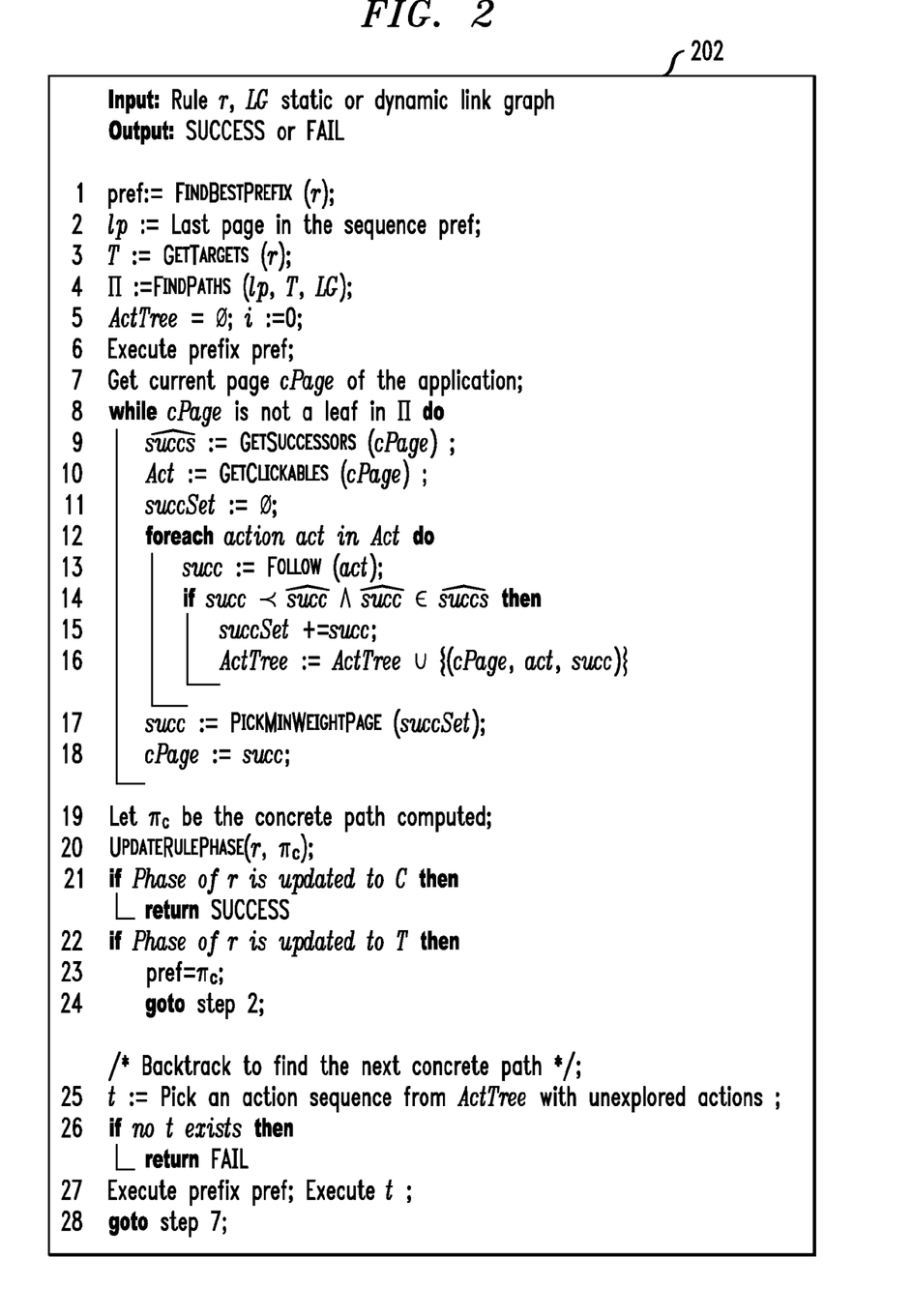
FIG. 2 is a diagram illustrating an algorithm for computing concrete paths for covering enterprise rules, according to an embodiment of the present invention.

Link graph constructor component 108 constructs a link graph to represent the navigation structure of the web application. Test case generator component 110 implements the algorithm (as illustrated in FIG. 2) for generating executable test cases that cover the input enterprise rules 102. Test data generator component 112 generates test data that is required to be entered on web page forms to navigate from one page to another. Execution trace generator component 114 generates an execution trace from a test case, wherein a trace includes a sequence of test steps and the application state after each test step. Further, coverage analyzer component 116 analyzes the execution traces of test cases and enterprise rules 102 to determine which of the rules are covered by the test cases.

As detailed herein, at least one embodiment of the invention includes test case generation for covering enterprise rules. At a high level, the coverage of a rule r requires the traversal of a specific path $\Pi_{ant}$ to trigger the antecedent of r, and the traversal of another specific path $\Pi_{cons}$ from $\Pi_{ant}$ to observe all consequent variables of r (while checking that the invariants of r are not violated along $\Pi_{cons}$). Thus, a test generation technique as detailed herein includes discovering the path $\Pi_{cov} = (\Pi_{ant} \cdot \Pi_{cons})$.

Accordingly, at least one embodiment of the invention includes performing a guided exploration that is directed, via a link graph, toward a set of pages that are relevant for observing the antecedent and consequent variables of a rule. A link graph (LG) is a directed graph in which nodes represent (server-side) application pages and edges represent possible navigations among the actual (hypertext markup language (HTML)) instances of these pages.

At least one embodiment of the invention includes iteratively exploring all candidate paths in the link graph that cover target pages relevant to a rule. In general, the candidate paths can be significantly fewer than the total number of paths in the application, which reduces the scope of the search for $\Pi_{cov}$. For each edge in a candidate path, there can be multiple actionable elements such that choosing different elements could generate different HTML pages. At least one embodiment of the invention addresses these challenges via a backtracking algorithm that aims to explore multiple candidate paths simultaneously. To increase efficiency, while covering a rule, aspects of the invention include reusing paths (or their prefixes) that were exercised during the exploration of previous rules.

Mechanical construction of the LG, via automatic static or dynamic analysis of the application, can pose a challenge because of the heterogeneous and highly dynamic nature of web applications. A typical application is implemented using a combination of multiple languages and technologies. Moreover, an application may have a very high degree of dynamism.

Accordingly, static analysis has to deal with the challenges posed by heterogeneity and dynamism to construct link graphs. For instance, it may be challenging to statically compute the navigation edges that are exposed only during dynamic execution (for example, links embedded in JavaScript code or links traversed due to page redirection). As such, at least one embodiment of the invention includes performing an analysis that, under certain assumptions, computes an over-approximate link graph. The statically constructed LG is referred to herein as the static link graph (SLG). The analysis performs a shallow scan of server-side JavaServer Pages (JSP) files to discover references and inclusions of other JSP files, and adds corresponding edges in the SLG. To ensure that the SLG indeed over-approximates the precise LG, the analysis assumes that all the files referenced by a navigation request from (HTML instances of) a particular file are explicitly mentioned in the file.

Alternatively, as detailed herein, the LG can be constructed by dynamically exploring an application (for example, to cover actionable elements). Such a graph is referred to herein as a dynamic link graph (DLG). The DLG under-approximates the precise LG because it may not consider all ways to reach a particular web page and, therefore, may miss navigation options from that page. However, because the DLG contains precise navigation edges, the DLG provides valuable guidance about link targets that are difficult to identify statically; thus, the DLG can speed up the analysis.

A DLG is constructed, in at least one embodiment of the invention, by exploring all navigational elements, iteratively, starting from the root HTML page of the application in a breadth-first manner. After exploring all elements in the root page, the construction techniques descend to new pages that are encountered, and the process is repeated for all unexplored navigational elements on that page.

To scale DLG construction to realistic applications, pruning can be performed. For instance, a page is considered new if its uniform resource locator (URL) is explored for the first time (without regards to the application state). If a navigational element e (a link or button) within a page is similar to another previously explored element e' in the page, e is not explored further. Two elements are considered similar if they are of the same type (for example, a link or submit button), and they result in the HTML pages generated from the same server-side script.

DLG construction needs to be performed only once for an application. Moreover, DLG construction can disambiguate actionable elements and has wide applicability across different server-side scripting technologies.

FIG. 2 is a diagram illustrating an algorithm 202 for computing concrete paths for covering enterprise rules, according to an embodiment of the present invention. Specifically, algorithm 202 depicts the pseudo-code of a guided test-generation technique. The algorithm takes, as input, a rule r and either generates a covering test case or returns a FAIL if all paths are explored or the specified time limit is reached.

Step 1 includes finding the best prefix. To increase the efficiency in covering a rule r, the algorithm 202 does not start anew; rather, the algorithm 202 tries to reuse the paths that were exercised previously while covering other rules. The algorithm 202 chooses a path from previously explored paths (or their prefixes) that cause the phase of r as T, VO, or AO, with higher preference to the path that causes r to be in T. If no previous traversals, or no traversals that push r into T, are available, the algorithm 202 generates an empty prefix.

Step 3 includes getting or obtaining targets. Specifically, the algorithm 202 identifies the set of target pages T that must be reached to observe the unobserved antecedent or consequent variables of r.

Step 4 includes finding or identifying paths. The algorithm 202 uses an LG to generate a path tree Π that covers the target set T and that can be used to extend p. If the LG is the SLG, these paths are abstract because they represent a static sequence of pages, and information about how to navigate from one page in the sequence to the next may be missing. Moreover, some of these paths may not be concretizable. If the LG is the DLG, the edges are accurate and concrete, but some of the paths may not have been exercised during the construction of the DLG, and some of the unexercised paths may not be concretizable. Therefore, for generality, these paths are also referred to as abstract paths.

The problem of computing the path tree is stated formally as follows. Given a source page src and a set of targets T, a path in the LG is identified which, starting from src, visits each page in T. Instead of iteratively computing a path and performing dynamic exploration to concretize it (inefficient in presence of high branching and unknown targets in web pages), algorithm 202 first computes the set of all candidate paths. The computed set of paths is stored compactly as a path tree, in which common path prefixes are shared. Also, the tree nodes are assigned weights equal to the length of the shortest path to any leaf in the tree. These weights can be used subsequently for ranking pages during the search for a concrete path.

In steps 5-24, the algorithm 202 attempts to extend p dynamically to visit all targets in T, and checks whether the phase of r improves. This is done via a backtracking procedure that iteratively attempts to compute a concrete path corresponding to an abstract path in Π. If a concrete path can be computed, the rule phase is updated to T or C. If the new phase is C, the algorithm 202 has generated a covering test for r. If the new phase is T, the algorithm 202 starts from Step 2 to observe the consequent of r. Otherwise, the algorithm 202 backtracks and attempts to concretize the next abstract path.

To find a concrete navigation path in the application from the paths in the path tree, the dynamic exploration addresses different technical challenges. The first two of the following challenges are specific for SLG, whereas the third challenge applies to both SLG and DLG.

1. Identifying the action statically to navigate from a page to the desired successor page may present a challenge because some actions, such as form submit actions, generate different successor pages based on the application state at the current page.

2. SLG may contain spurious paths that cannot be concretized. Moreover, the path tree Π may not, in general, identify the exact actionable elements that lead to a particular successor page because such information may not be known statically. In this case, the dynamic exploration must try all elements to identify the one that leads to the desired page. Accordingly, Π can have a high degree of branching; therefore, exploring all elements at each page during search can be expensive. Finding a concrete path based on Π also entails checking if an actual page cp matches with a page ap $\in$ Π. At least one embodiment of the invention includes checking (cp $\prec$ ap) by checking if the URL of ap and cp are the same.

3. Navigation from one page to another can require appropriate data to be entered into form fields.

The algorithm 202 overcomes these challenges as follows. By way of example, the algorithm 202 executes the best prefix (pref) to bring the application to the desired page cPage (step 6). From cPage, the algorithm 202 attempts to find a concrete path $\Pi_c$ to some leaf of the path tree $\Pi$, such that all target nodes are visited on $\Pi_c$. Toward this goal, the algorithm 202 can explore multiple successor pages simultaneously and select the most promising static successor based on the distance from the target nodes (as further described herein). The technique includes querying $\Pi$ to obtain a set of successor pages sucĉs (using GETSUCCESSORS, step 9) from the current page cPage. The set sucĉs returned by GETSUCCESSORS contains all static successors of cPage in $\Pi$ with the property that any concrete path that covers all the targets must visit at least one of these successors.

Step 10 includes getting or obtaining clickables, which are the user-interface elements on which an action can be performed. Accordingly, the technique attempts to navigate to some page succ which belongs to the set $\overrightarrow{sucĉ}$ (that is, succ $\prec$ sucĉ for some static successor sucĉ $\in$ sucĉs). These steps are repeated iteratively until a leaf page is reached with all targets visited on the current path.

To identify the page succ, the algorithm 202 identifies all actionable elements that result in any of the pages in sucĉs. These actionable elements help navigate between pages include types, for example, including the following: (a) form submit actions whose target is known statically, (b) navigation links with known targets, and (c) form submit actions whose target is not known statically.

The algorithm 202 also computes the set succSet of all the concrete successor pages of cPage obtained by clicking on all possible actionable elements (steps 12-16) using the FOLLOW procedure. (This step is required only if the LG is the SLG.) The pages in succSet are ranked based on the distance from leaf nodes (using the weights of their abstract counterparts) and the page with the least/lowest weight is chosen as the successor succ (PICKMINWEIGHTPAGE, line 13). As an optimization, before computing the succSet, the algorithm 202 can search for actions whose targets are known statically and are labeled with the least/lowest weight. If such actions exist, the algorithm 202 attempts to navigate via them; only if these actions fail to reach the correct target are other actions tried. Among actions with known targets, the algorithm 202 prefers exploring pages obtained by clicking form submit actions to pages obtained by clicking anchor links. This is because, in many cases, the submit actions not only lead to a new page, but also cause an application state change, which in turn, is more likely to update the phase of a rule.

As detailed herein, at least one embodiment of the invention also includes test data generation. In general, the form submit actions require input test data to successfully execute the action. At least one embodiment of the invention includes generating the necessary data for editable elements via (a) by solving constraints present in rules or provided by user separately, (b) reusing data from previous explorations, (c) using provided form data (for example, for log-in, password fields, etc.), or (d) randomly generated data.

In steps 25-28, the algorithm 202 checks whether there exists any unexplored actionable element act in the current ActTree while executing the concrete path. If so, the algorithm 202 backtracks by executing the previously explored concrete path (prefix (pref) followed by t) corresponding the action act. If all action sequences have been explored, the procedure GENERATETESTS returns a FAIL.

Additionally, at least one embodiment of the invention includes handling Ajax-based systems. In traditional systems such as JSP or PHP, application states are explicit and correspond to pages that have unique URLs. In Ajax-based systems, application states are represented through document object model (DOM) contents. To handle Ajax-based systems, at least one embodiment of the invention includes providing a means to specify application states of the system using "wireframes" or application UI mockups. These states can be used to specify enterprise rules as well. Additionally, at least one embodiment of the invention includes providing a means to specify mappings from run-time states to application states via DOM comparators. In Ajax-based systems, various run-time states can correspond to the same application state.

By way of example, consider the following example enterprise rules:
1) Once a card type is added, it should be visible on the registration page where the card type option is available.
2) Discount should be computed as follows:
   If invoice amount is more than $100, discount=10%.
   If invoice amount is between $50 and $100, discount=5%.
   If invoice amount is less than $50, discount=0%.
3) The data entered by a user on successful registration should be visible on the user page.
4) Users logged in as admin should have admin functions enabled.

Figure 3:
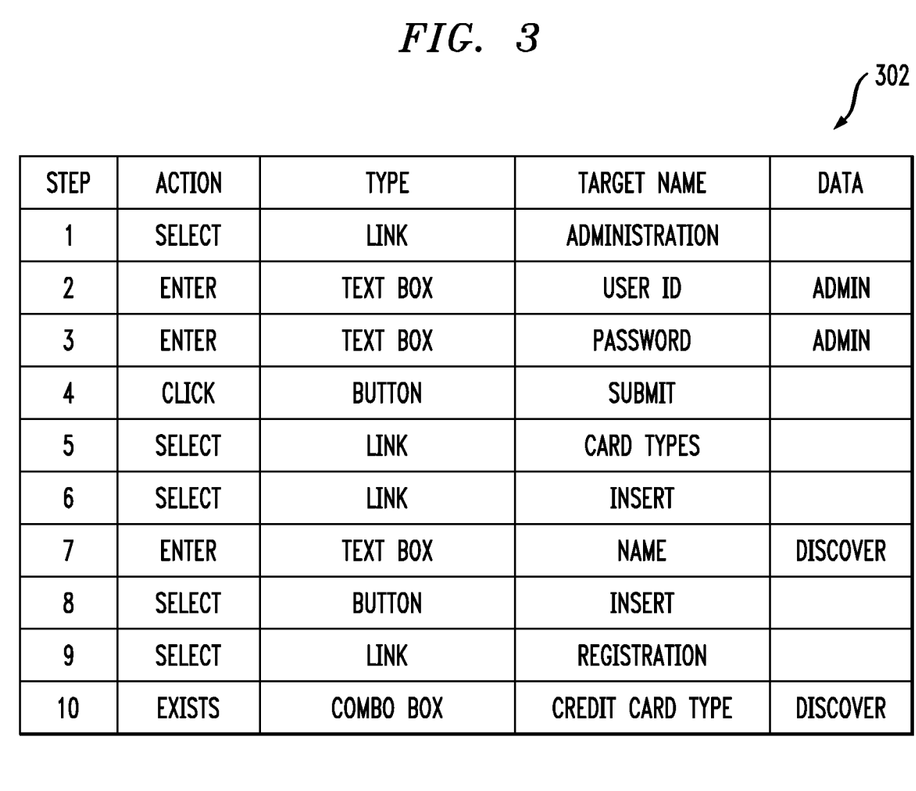
FIG. 3 is a diagram illustrating an executable test case that covers one of an example enterprise rule, accordingly to an embodiment of the invention.

By way of further illustration and example, FIG. 3 is a diagram illustrating an executable test case 302 that covers Rule 1 in the above example enterprise rules, accordingly to an embodiment of the invention. As depicted, FIG. 3 details the steps, actions, item type, target name and data in illustrating a test case that covers Rule 1.

Figure 4:
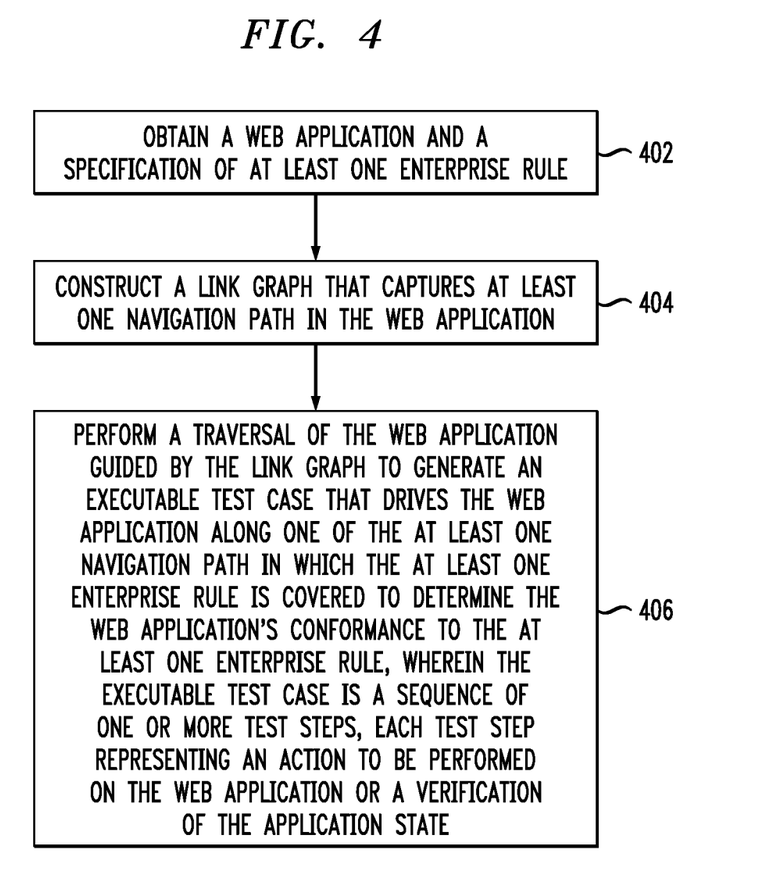
FIG. 4 is a flow diagram illustrating techniques for automated test case generation for a web application, according to an embodiment of the invention.

FIG. 4 is a flow diagram illustrating techniques for automated test case generation for a web application, according to an embodiment of the present invention. Step 402 includes obtaining a web application and a specification of at least one enterprise rule. As detailed herein, each enterprise rule includes an antecedent, a consequent, and one or more invariant conditions stated in a vocabulary of one or more enterprise rule variables. Additionally, the vocabulary of enterprise rule variables is drawn from a set of labels that occur on the application web page and a set of collection variables, where a collection variable represents a predefined set of values (such as user IDs).

Step 404 includes constructing a link graph that captures at least one navigation path in the web application. The link graph can be constructed statically by analyzing one or more server-side scripts that generate the application web page, and can also be constructed dynamically by driving the web application through a browser in a bounded exhaustive manner.

Step 406 includes performing a traversal of the web application (for example, through a user interface of the web application) guided by the link graph to generate an executable test case that drives the web application along one of the at least one navigation paths in which the at least one enterprise rule is covered to determine the web application's conformance to the at least one enterprise rule, wherein the executable test case is a sequence of one or more test steps, each test step representing an action to be performed on the web application and/or a verification of the application state. The executable test case can also include data values required by actions. Further, in at least one embodiment of the invention, the executable test case can be run repeatedly, without human intervention, during regression testing.

The step of performing the traversal can also include identifying one or more target web pages to be navigated to, starting from a source web page. Further, at least one embodiment of the invention includes computing a tree of paths, by analyzing the link graph, over which the one or more target pages can be reached. Also, each path in the tree of paths can be explored dynamically by generating a sequence of one or more actions to determine the path that reaches the one or more target pages from the source page.

The techniques depicted in FIG. 4 can additionally include selecting an enterprise rule for which to generate an executable test case. Further, at least one embodiment of the invention includes specifying an application state for an Ajax-based system and instructions to map a run-time state to an application state.

Figure 5:
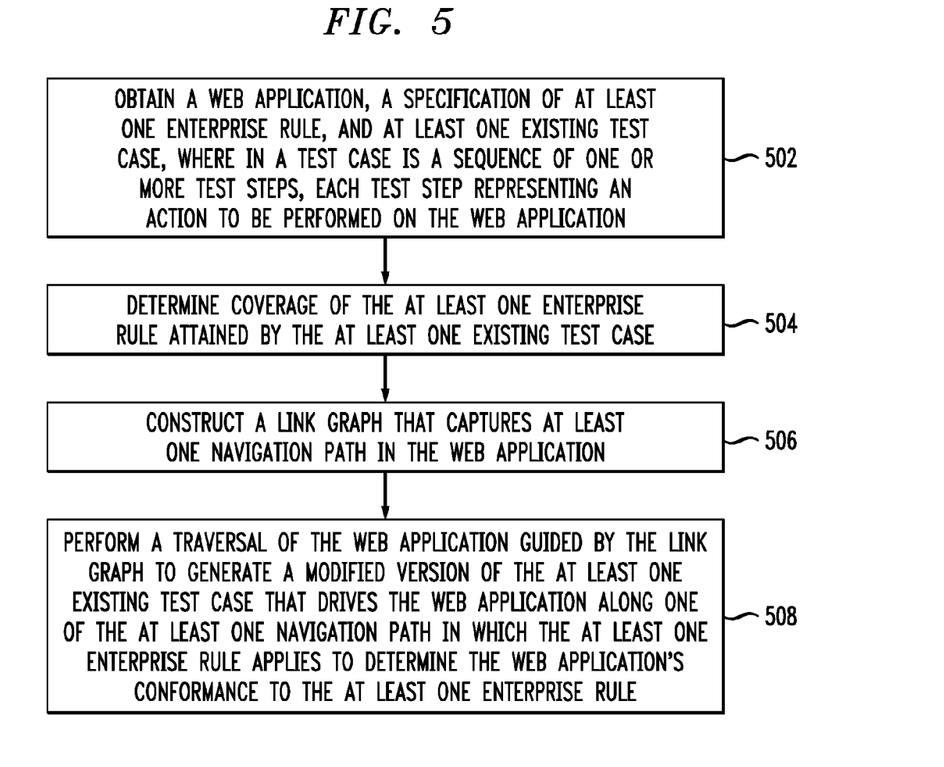
FIG. 5 is a flow diagram illustrating techniques for automated test case generation for a web application, according to an embodiment of the invention.

FIG. 5 is a flow diagram illustrating techniques for automated test case generation for a web application, according to an embodiment of the invention. Step 502 includes obtaining a web application, a specification of at least one enterprise rule, and at least one existing test case, wherein a test case is a sequence of one or more test steps, each test step representing an action to be performed on the web application. Step 504 includes determining coverage of the at least one enterprise rule attained by the at least one existing test case.

Step 506 includes constructing a link graph that captures at least one navigation path in the web application. Step 508 includes performing a traversal of the web application guided by the link graph to generate a modified version of the at least one existing test case that drives the web application along one of the at least one navigation paths in which the at least one enterprise rule applies to determine the web application's conformance to the at least one enterprise rule.

The techniques depicted in FIG. 5 can additionally include selecting an existing test case and a step in the existing test case to generate a modified version of the at least one existing test case, wherein said selecting is based on relevance of the existing test case and the step in the existing test case to the at least one enterprise rule.

The techniques depicted in FIG. 4 and FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 and FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 6:
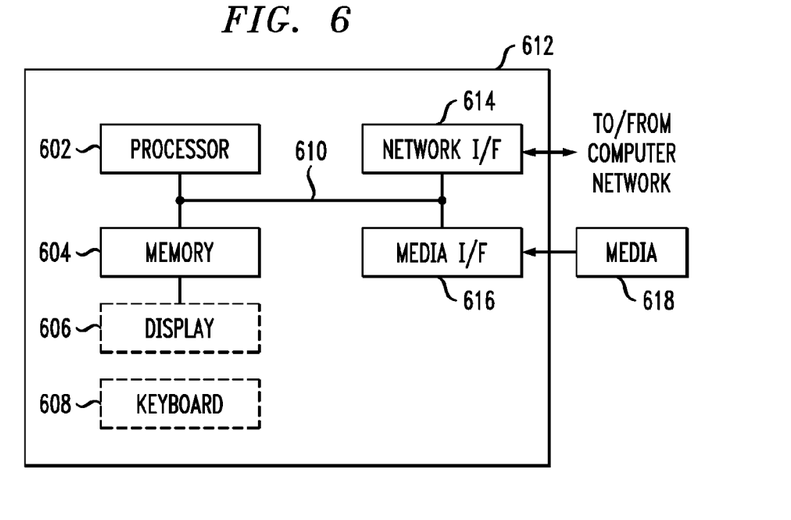
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, improving the effectiveness and efficiency of functional testing of web applications via automated creation of executable test cases.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automated test case generation for a web application, the method comprising:
   obtaining a web application and a specification of at least one enterprise rule comprising (i) an antecedent, (ii) a consequent, and (iii) a set of one or more invariant conditions, wherein:
   the antecedent represents a discrete state of the web application that is observable at a user interface level at a given point of execution of the web application;
   the consequent represents another discrete state of the web application that is observable at the user interface level at a given point of execution of the web application subsequent to the antecedent; and
   the set of one or more invariant conditions comprises one or more conditions that are observable during execution of the web application between the given point representing the antecedent and the given point representing the consequent;
   constructing a link graph that captures at least one navigation path in the web application; and
   performing a traversal of the web application guided by the link graph to generate an executable test case that drives the web application along one of the at least one navigation paths in which the at least one enterprise rule is covered to determine the web application's conformance to the at least one enterprise rule, wherein the executable test case is a sequence of one or more test steps, each test step representing an action to be performed on the web application and/or a verification of the application state;
   wherein at least one of the steps is carried out by a computer device.

2. The method of claim 1, wherein the executable test case can be run repeatedly, without human intervention, during regression testing.

3. The method of claim 1, wherein the antecedent, the consequent, and the one or more invariant conditions are stated in a vocabulary of one or more enterprise rule variables.

4. The method of claim 3, wherein the vocabulary of one or more enterprise rule variables is drawn from a set of labels that occur on the application web page and a set of collection variables, wherein a collection variable represents a predefined set of values.

5. The method of claim 1, wherein the link graph is constructed statically by analyzing one or more server-side scripts that generate an application web page.

6. The method of claim 1, wherein the link graph is constructed dynamically by driving the web application through a browser in a bounded exhaustive manner.

7. The method of claim 1, wherein said performing comprises performing a traversal of the web application through a user interface of the web application.

8. The method of claim 1, wherein the executable test case includes a data value required by the action.

9. The method of claim 1, comprising selecting an enterprise rule for which to generate an executable test case.

10. The method of claim 1, wherein said performing comprises identifying one or more target web pages to be navigated to, starting from a source web page.

11. The method of claim 10, comprising computing a tree of paths, by analyzing the link graph, over which the one or more target pages can be reached.

12. The method of claim 11, comprising exploring each path in the tree of paths dynamically by generating a sequence of one or more actions to determine the path that reaches the one or more target pages from the source page.

13. The method of claim 1, comprising specifying an application state for an Ajax-based system and instructions to map a run-time state to an application state.

14. An article of manufacture comprising a non-transitory computer readable storage medium having computer readable instructions tangibly embodied thereon which, when implemented, cause a computer to carry out a plurality of method steps comprising:
   obtaining a web application and a specification of at least one enterprise rule comprising (i) an antecedent, (ii) a consequent, and (iii) a set of one or more invariant conditions, wherein:
   the antecedent represents a discrete state of the web application that is observable at a user interface level at a given point of execution of the web application;
   the consequent represents another discrete state of the web application that is observable at the user interface level at a given point of execution of the web application subsequent to the antecedent; and
   the set of one or more invariant conditions comprises one or more conditions that are observable during execution of the web application between the given point representing the antecedent and the given point representing the consequent;
   constructing a link graph that captures at least one navigation path in the web application; and
   performing a traversal of the web application guided by the link graph to generate an executable test case that drives the web application along one of the at least one navigation path in which the at least one enterprise rule is covered to determine the web application's conformance to the at least one enterprise rule, wherein the executable test case is a sequence of one or more test steps, each test step representing an action to be performed on the web application or a verification of the application state.

15. The article of manufacture of claim 14, wherein the link graph is constructed statically by analyzing one or more server-side scripts that generate an application web page.

16. The article of manufacture of claim 14, wherein the link graph is constructed dynamically by driving the web application through a browser in a bounded exhaustive manner.

17. The article of manufacture of claim 14, wherein said performing comprises performing a traversal of the web application through a user interface of the web application.

18. The article of manufacture of claim 14, wherein the executable test case includes a data value required by the action.

19. The article of manufacture of claim 14, wherein the method steps comprise selecting an enterprise rule for which to generate an executable test case.

20. A system for automated test case generation for a web application, comprising:
   at least one distinct software module, each distinct software module being embodied on a tangible computer-readable medium;
   a memory; and
   at least one processor coupled to the memory and operative for:
      obtaining a web application and a specification of at least one enterprise rule comprising (i) an antecedent, (ii) a consequent, and (iii) a set of one or more invariant conditions, wherein:
         the antecedent represents a discrete state of the web application that is observable at a user interface level at a given point of execution of the web application;
         the consequent represents another discrete state of the web application that is observable at the user interface level at a given point of execution of the web application subsequent to the antecedent; and
         the set of one or more invariant conditions comprises one or more conditions that are observable during execution of the web application between the given point representing the antecedent and the given point representing the consequent;
      constructing a link graph that captures at least one navigation path in the web application; and
      performing a traversal of the web application guided by the link graph to generate an executable test case that drives the web application along one of the at least one navigation path in which the at least one enterprise rule is covered to determine the web application's conformance to the at least one enterprise rule, wherein the executable test case is a sequence of one or more test steps, each test step representing an action to be performed on the web application or a verification of the application state.

21. A method for automated test case generation for a web application, the method comprising:
   obtaining a web application, a specification of at least one enterprise rule, and at least one existing test case, wherein a test case is a sequence of one or more test steps, each test step representing an action to be performed on the web application, and wherein the specification of the at least one enterprise rule comprises (i) an antecedent, (ii) a consequent, and (iii) a set of one or more invariant conditions, wherein:
      the antecedent represents a discrete state of the web application that is observable at a user interface level at a given point of execution of the web application;
      the consequent represents another discrete state of the web application that is observable at the user interface level at a given point of execution of the web application subsequent to the antecedent; and
      the set of one or more invariant conditions comprises one or more conditions that are observable during execution of the web application between the given point representing the antecedent and the given point representing the consequent;
   determining coverage of the at least one enterprise rule attained by the at least one existing test case;
   constructing a link graph that captures at least one navigation path in the web application; and
   performing a traversal of the web application guided by the link graph to generate a modified version of the at least one existing test case that drives the web application along one of the at least one navigation paths in which the at least one enterprise rule applies to determine the web application's conformance to the at least one enterprise rule;
   wherein at least one of the steps is carried out by a computer device.

22. The method of claim 21, comprising selecting an existing test case and a step in the existing test case to generate a modified version of the at least one existing test case, wherein said selecting is based on relevance of the existing test case and the step in the existing test case to the at least one enterprise rule.

23. An article of manufacture comprising a non-transitory computer readable storage medium having computer readable instructions tangibly embodied thereon which, when implemented, cause a computer to carry out a plurality of method steps comprising:
   obtaining a web application, a specification of at least one enterprise rule, and at least one existing test case, wherein a test case is a sequence of one or more test steps, each test step representing an action to be performed on the web application, and wherein the specification of the at least one enterprise rule comprises (i) an antecedent, (ii) a consequent, and (iii) a set of one or more invariant conditions, wherein:
      the antecedent represents a discrete state of the web application that is observable at a user interface level at a given point of execution of the web application;
      the consequent represents another discrete state of the web application that is observable at the user interface level at a given point of execution of the web application subsequent to the antecedent; and
      the set of one or more invariant conditions comprises one or more conditions that are observable during execution of the web application between the given point representing the antecedent and the given point representing the consequent;
   determining coverage of the at least one enterprise rule attained by the at least one existing test case;
   constructing a link graph that captures at least one navigation path in the web application; and
   performing a traversal of the web application guided by the link graph to generate a modified version of the at least one existing test case that drives the web application along one of the at least one navigation path in which the at least one enterprise rule applies to determine the web application's conformance to the at least one enterprise rule.

* * * * *